Dec. 14, 1943.     J. H. RAND, JR     2,336,638
ELECTRIC RAZOR
Filed March 15, 1939
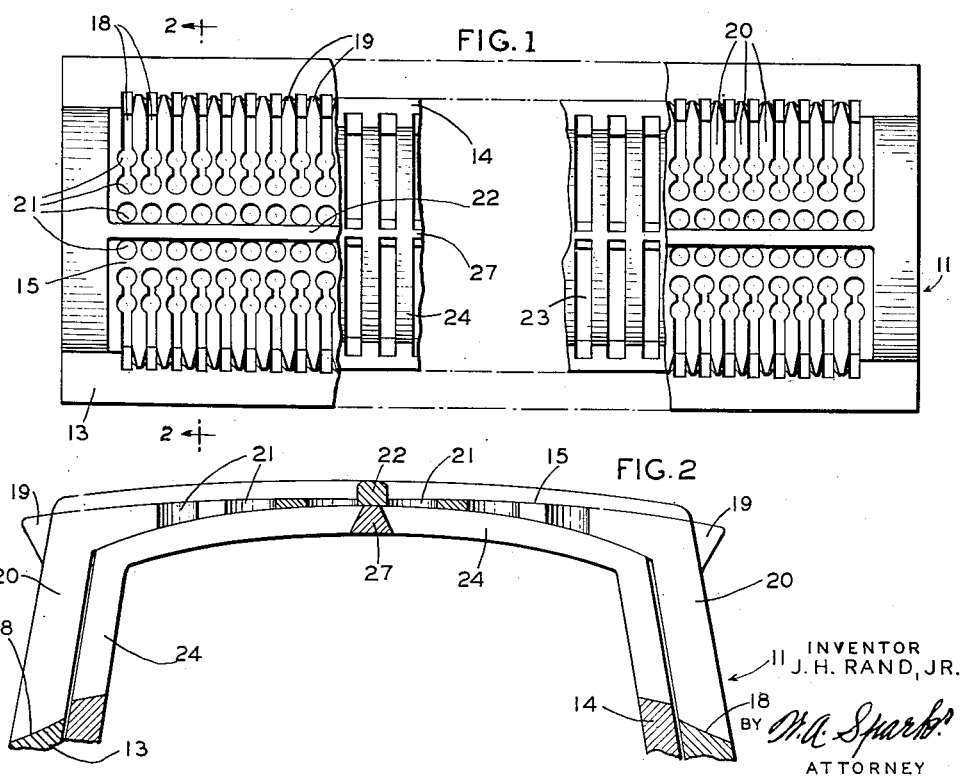
INVENTOR
J. H. RAND, JR.
BY *W. A. Sparks*
ATTORNEY Patented Dec. 14, 1943

2,336,638

UNITED STATES PATENT OFFICE 2,336,638

ELECTRIC RAZOR

James H. Rand, Jr., Stamford, Conn., assignor to Remington Rand, Inc., Buffalo, N. Y., a corporation of Delaware Application March 15, 1939, Serial No. 261,866

4 Claims. (Cl. 30—43)

This invention relates to improvements in electric razors, and more particularly to a novel construction of the shearing members thereof, whereby these members are strengthened without loss of cutting effectiveness.

The ultimate aim in the construction of dry shavers has been to provide a shaving head having cutting surfaces thin enough to shave closely without irritating the skin. For the most part in the commercially known shavers, this goal has not yet been reached, or, if in some instances it has, it has resulted in unduly weakening the structure of the shearing members.

This invention comprehends a structure that has thickened surfaces on each side, gradually diminishing in thickness towards the central portion of the cutting surface where a raised longitudinal land serves the purpose of giving additional strength and support to the member and also provides a hair tripping or aligning medium.

A principal object of this invention is to provide a shearing member which will cut hairs of varying length with equal efficiency and which affords means for properly guiding and tripping the hair into the cutting portions of the shearing member.

Another object of the invention is to provide a strong and unyielding shearing head that will assure a close shave, without discomfort from burning or chafing.

Other and additional features and objects will be more fully disclosed in the following detailed description of this invention, when read in conjunction with the accompanying drawing, in which Fig. 1 is a plan view of another modified form of shearing head with parts broken away, and Fig. 2 is an enlarged view in cross section taken substantially along line 2—2 of Fig. 1.

Figs. 1 and 2 inclusive disclose slots 18 joined to perforations 21 so that they form slots that are partly recessed. The straight portion of each slot is disposed in the thicker area of upper portion 15 while the recessed portions of each slot are cut in a thinner portion of the plate. The thinnest portion of the plate is perforated with a longitudinal series of unconnected openings 21.

Figs. 1 and 2 disclose a form of outer shear plate 13. The opposite sides of the plate are of equal thickness and this thickness diminishes or tapers off, uniformly towards the middle of the plate. This tapering of the plate is not carried through its mid point so that there is formed, at that intermediate position, a longitudinal bar 22 which projects above the upper portion 15. In effect, there is thus formed two separate cutting areas which lie on opposite sides of the bar 22.

Inner cutter 14 is reciprocally mounted within outer shear plate 13. It has slots 23 forming cutter bars 24. In Figs. 1 and 2, inner cutter 14 is shown with a convex upper surface of uniform thickness. A longitudinal land 27 intersects slots 23 and cutter bars 24 at their mid points.

It will be readily seen from the construction of the device described and illustrated that the present invention provides means for improving the shearing action of a mechanical razor. One evident advantage of a shear plate having both slotted and perforated cutting areas is that the slots, cut in the thicker portions of the plate, act to guide short hairs into the thinner perforated portion of the plate. Also, the structure of the head, with its varying thicknesses, combines strength and durability with an unusually efficient cutting action. The longitudinal bar 22 projecting upward over upper portion 15 also provides means for straightening the hair for proper entry into the cutting areas. It will be observed that by varying the thickness of the shear plate, a variably effective cutting action is obtained. Thus if, for any reason, it should be desired not to shear the hair close to the skin, this type of shearing action may be obtained by applying only the thick portion of the plate to the skin.

What I claim as new, and desire to secure by Letters Patent, is:

1. A shear plate for a shaving implement having a raised longitudinal bar and a slotted and perforated cutting surface of progressively increasing thickness on each side of said bar.

2. A shear plate for a shaver having a longitudinal raised bar and first a perforated and then a slotted cutting surface of gradually increasing thickness on each side of said bar, said bar affording means to reinforce said plate and trip the hairs into the perforated portions thereof.

3. A shear plate for a shaver having upper cutting surfaces, a continuous longitudinal bar projecting above and intersecting said cutting surfaces, said cutting surfaces being of varying thickness.

4. A shear plate for a shaver having upper cutting surfaces, a central longitudinal bar projecting above said cutting surfaces, each of said cutting surfaces being of varying thickness.

JAMES H. RAND, JR.